INVENTORS
Edward J. Glenner
Imre Molnar
BY C. R. Sipe
Atty.

March 14, 1961 E. J. GLENNER ET AL 2,975,236

MAGNETIC DRUM STORAGE

Filed June 25, 1957 5 Sheets-Sheet 2

INVENTOR.
Edward J. Glenner
Imre Molnar
BY C. R. Sipe
Attys.

INVENTORS
Edward J. Glenner
Imre Molnar
BY C. R. Sipe
Atty.

INVENTORS
Edward J. Glenner
Imre Molnar
BY C. R. Sipe
Atty.

INVENTORS
Edward J Glenner
Imre Molnar
BY C. R. Sipe
Atty.

United States Patent Office 2,975,236

Patented Mar. 14, 1961

2,975,236

MAGNETIC DRUM STORAGE

Edward J. Glenner and Imre Molnar, Chicago, Ill., assignors to Automatic Electric Laboratories, Inc., a corporation of Delaware Filed June 25, 1957, Ser. No. 667,788

7 Claims. (Cl. 179—18)

Figure 1:
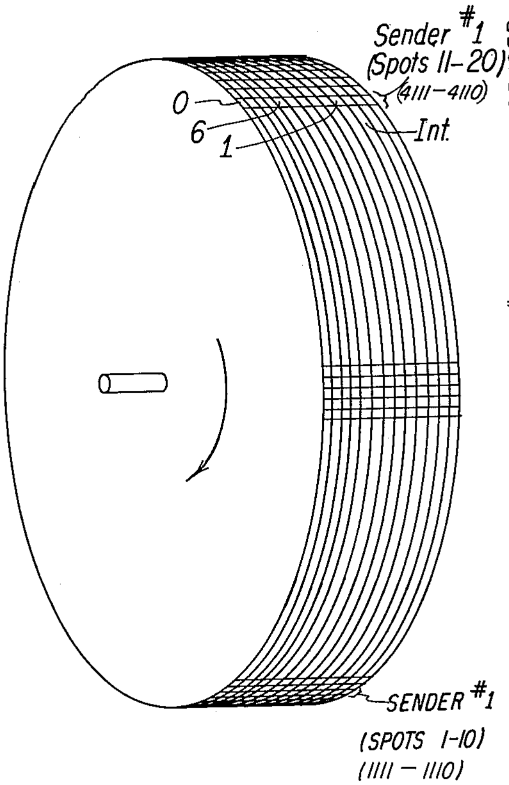

The present invention relates to digit storage systems and more particularly to those of the magnetic drum type as applied to telephone systems.

The invention has been designed for use in a telephone system where digits may be originated at a number of locations and conveyed to a centralized storage location. The digits are then stored for a finite length of time and transmitted accordingly.

It is therefore an object of the present invention to provide a magnetic drum storage system which may receive digits, each in the form of a single decimal representation, simultaneously from a maximum of 200 initiating positions, store these digits and then translate each digit into a series of interrupted dial type pulses for controlling step-by-step switching equipment.

It is another object of the present invention to provide a continuously rotating magnetic storage drum, common to all the senders at a plurality of operator positions, for receiving an incoming digit designation from any or all the operator senders on any one revolution of the drum, each digit designation comprising only a single pulse on one of ten conductors corresponding to the ten basic digits 1 to 0, inclusive; for storing each of such received digit designations on the magnetic drum in two separate locations which are allocated to the particular sender originating such digit designations and which correspond to the value of such digit designations; and thereafter transmitting each stored digit in the form of a series of interrupted direct current pulses of predetermined length, each series corresponding in number to the value of the stored digit being transmitted.

A further object of the invention is to provide a system which receives digits in binary-decimal form and transmits these digits in the form of interrupted direct current pulses.

A feature of the invention relates to a storage system which transmits its output digits in the form of interrupted direct current pulses at the rate of 10 pulses per second with a 40% make.

The drum as used herein is a generally known type of drum having 13 peripheral tracks each having 5000 magnetizable spots. Needless to say the spots in each track are parallelly aligned with the spots in the remaining tracks and each parallel alignment is identified as a numbered location. Each of the sending stations or operators positions having access to the drum has permanently allocated to it twenty locations on the drum. The first ten of the locations for a particular sender are successive and form a continuous band ten spots long peripherally and thirteen tracks wide. The second ten locations allocated to the particular sender are displaced from the first ten locations by 3000 locations peripherally. The drum rotates at a speed of 600 revolutions per minute or ten revolutions per second. In millisecond form, this of course is 100 ms. per revolution. The first set of ten locations then is displaced in time from the second set by 60 milliseconds from the second set to the first set by 40 milliseconds.

It will be remembered that the normal dial pulsing speed in use in step by step telephone systems is 10 pulses per second. A single pulse therefore using a 40% make and 60% break would have a 40 millisecond make and 60 milliseconds break.

Assuming a digit six were to be stored as the first digit from an operator's position. In the sixth digit storage track of the first allocated locations, magnetic spots would be impressed in two locations on the drum. The locations are separated by 60% of a revolution of the drum. When the digit is to be transmitted, the drum would transmit a signal and a second signal 60 milliseconds later. The interval would be transformed into a 60 ms. break period in the output transmitting circuit. A 40 millisecond make period in the output circuit would follow, after which the drum would cause the magnetized spots to be indexed to the #5 track and erased from the #6 track. Five additional break-make sequences in the output circuit would follow on the next five revolutions of the drum after which a 500 ms. break would follow providing an interdigital pause. The next digit which had stored would then be transmitted. In this manner a ten digit sequence can be stored and sent through a single operators position.

The circuit as set out is presently used for ten digit storage from each of a maximum of 200 senders. If twelve or more digits are required to be stored for each sender, as seems to be the forthcoming trend, the eleventh and subsequent digits would not be stored before the first of the previously stored digits had been sent. The eleventh digit then can be stored in the first location, the first digit having been transmitted by the time of storage of the eleventh. This is handled by the normal decimal reflexing of the system. The remainder of the system includes the means for storing digits sequentially and removing them in the same order.

Figure 2:
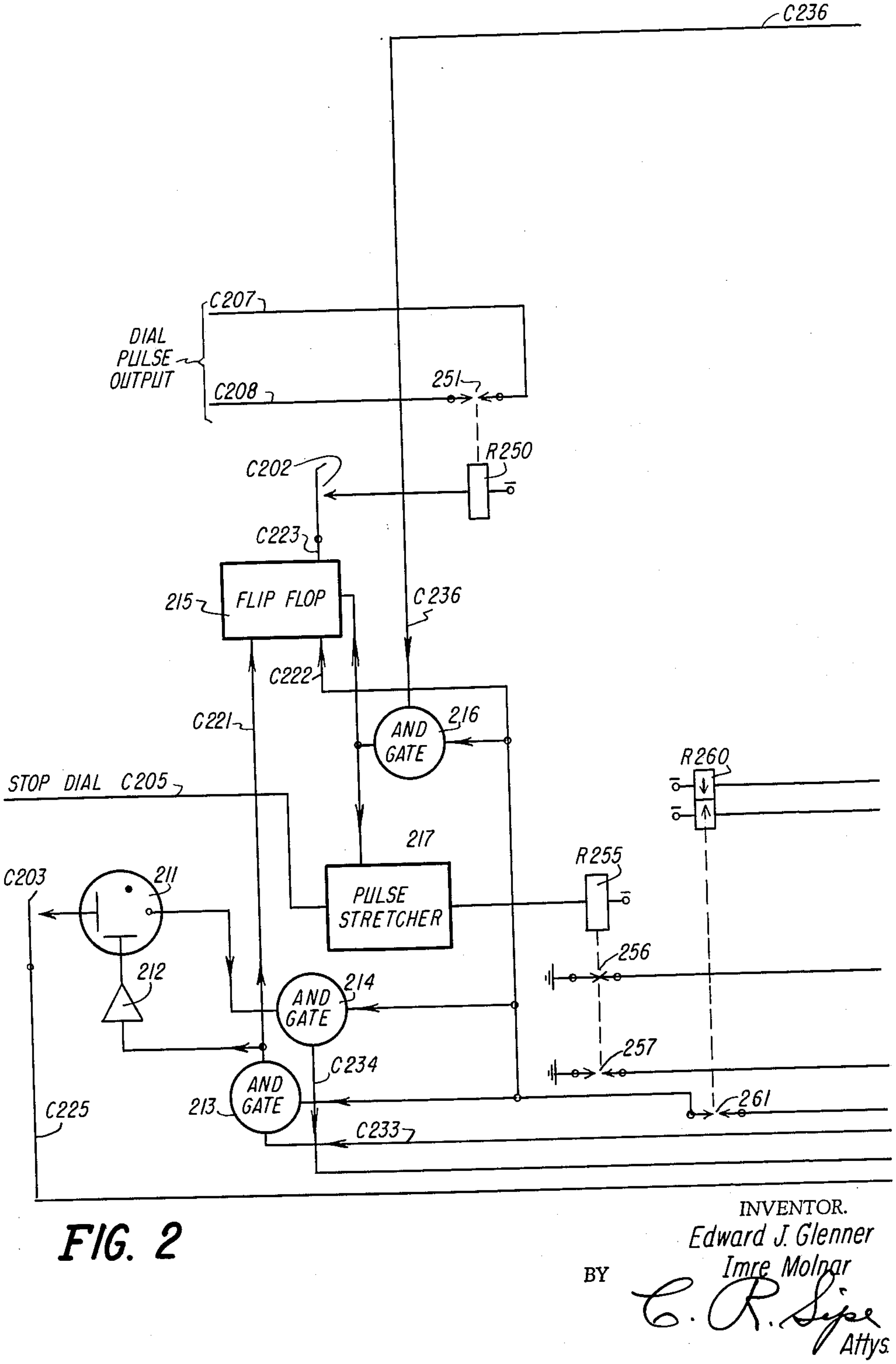
Figure 3:
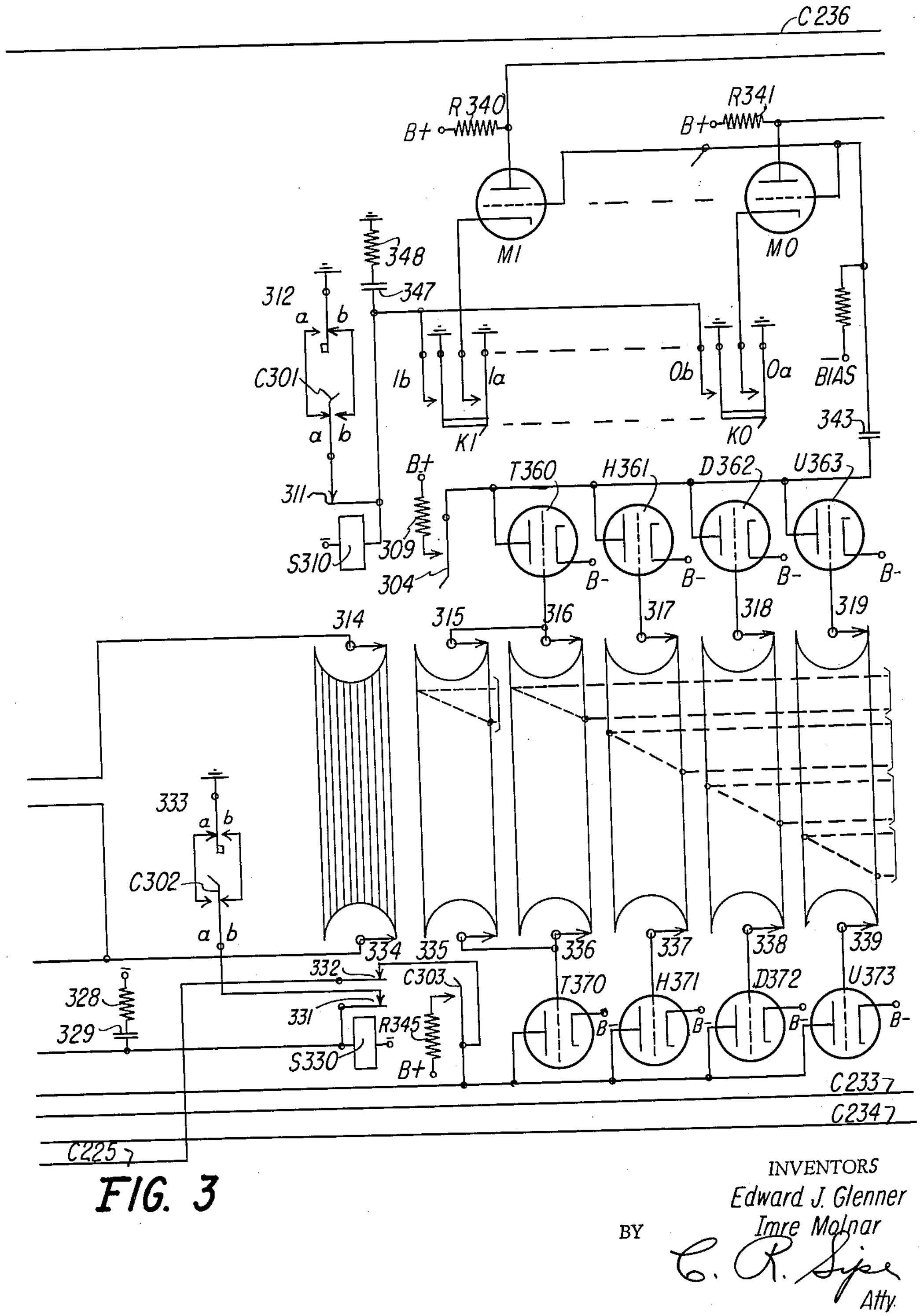
Figure 4:
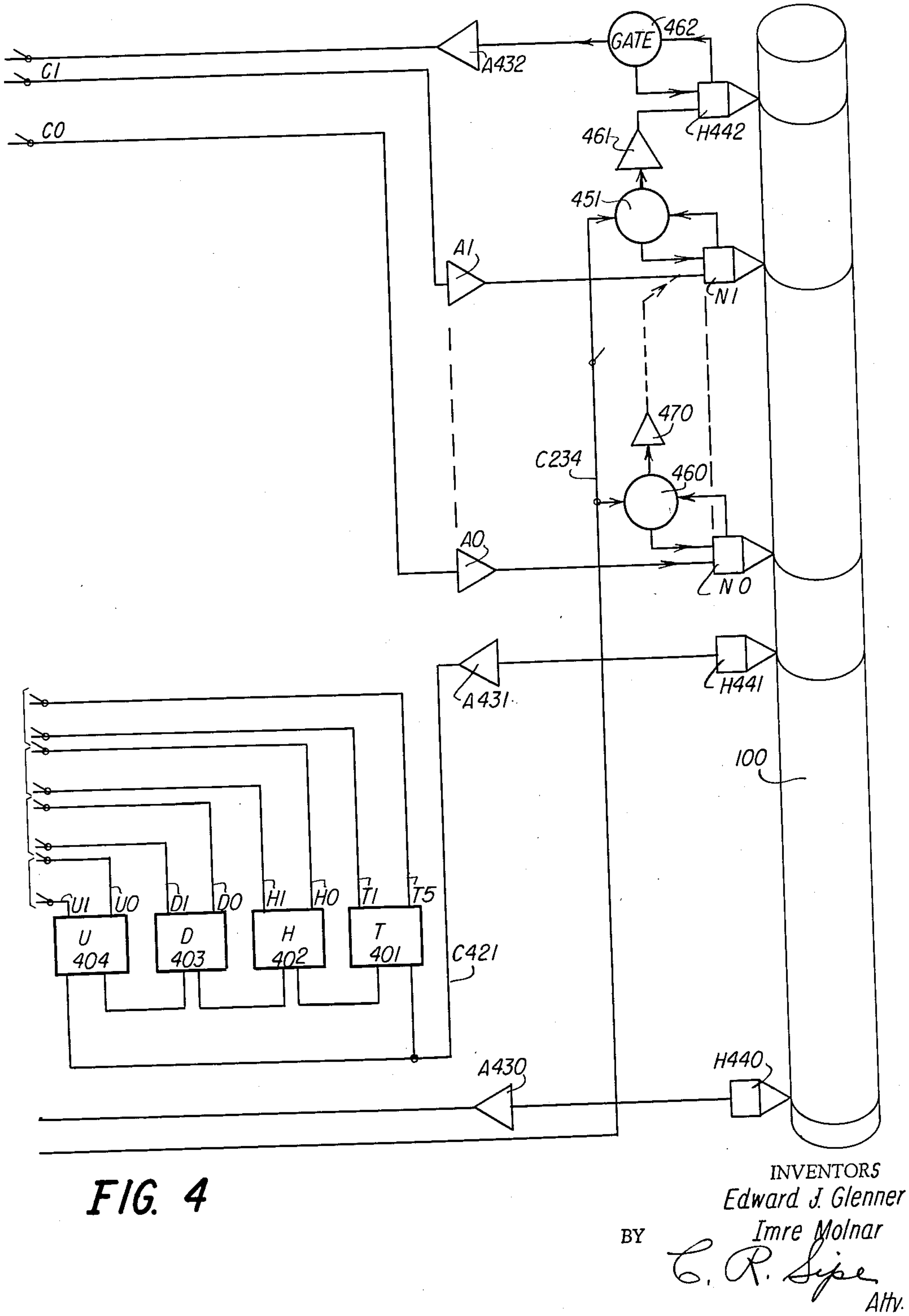
Figure 5:
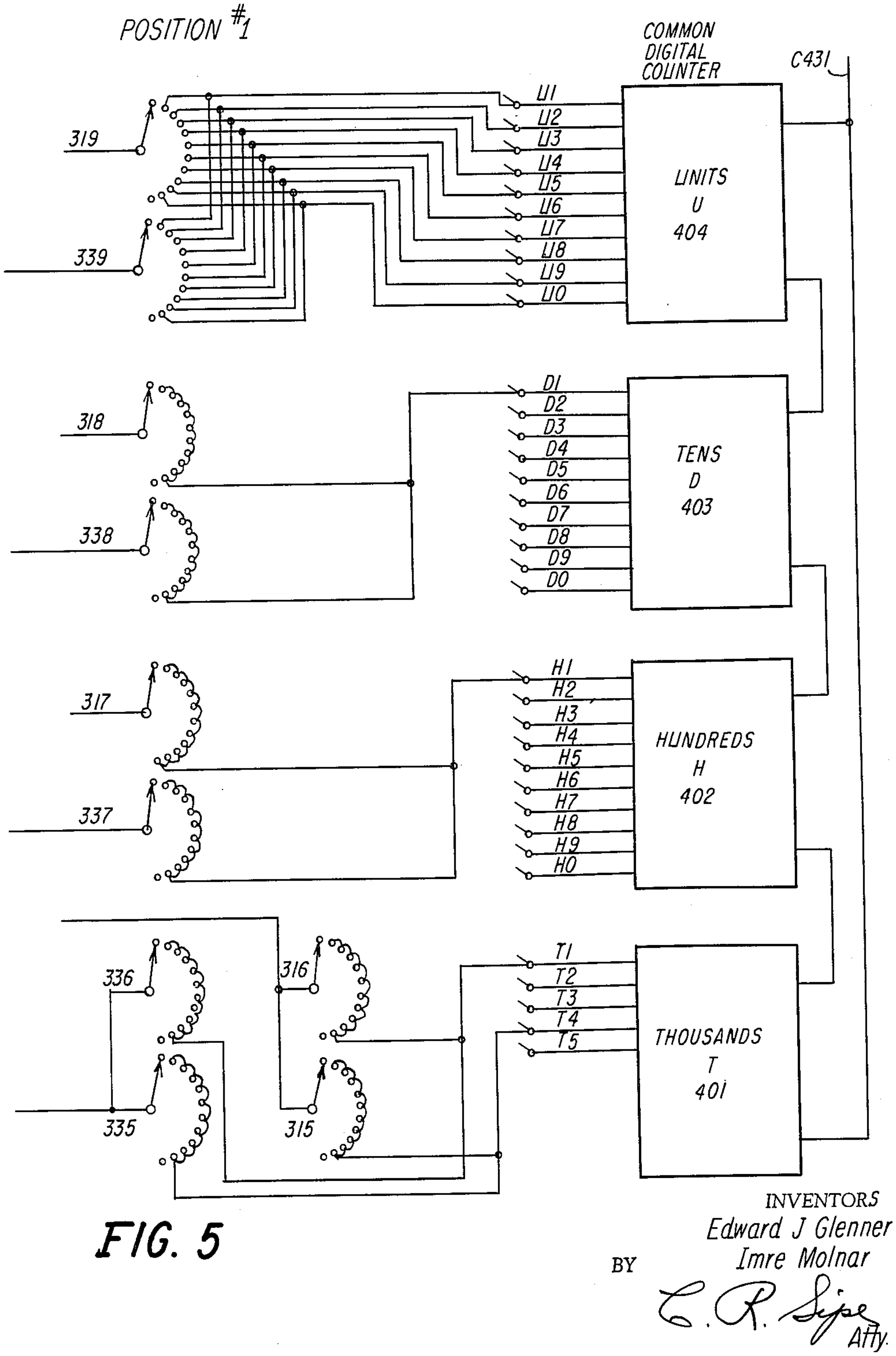

The figures as used are as follows: Fig. 1 is a pictorial representation of the drum tracks and spots and a table of locations. Figs. 2 and 3 show the equipment per sender which is required. Fig. 4 shows the equipment common to the entire system for storage. Fig. 5 shows in detail the interconnection switches of Fig. 3 to Fig. 4.

Figure 1A:
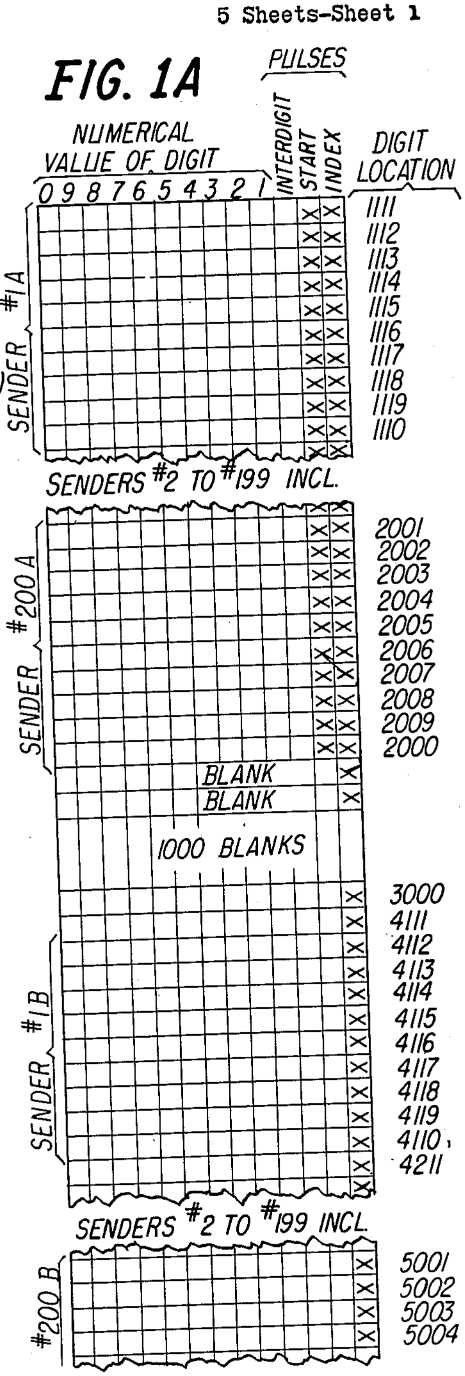

Fig. 1 shows schematically the locations of the tracks on the drum and the sender allocations. Fig. 1A is a planar development of the drum peripheral surface as indicated in Fig. 1.

The upper square in Fig. 1A shows the first group of spots allocated to sender 1. Each spot appears as a square within the larger sender allocation square. Magnetized spots are indicated by an "X" within the spot. The vertical parallel tracks as shown include reading from right to left: the indexing track, the start track, the interdigital pause track and the ten digit value tracks 1–0. The horizontal positions include storage locations for the first through tenth successive digits.

Each sender has a similar allocation up to and including sender 200 as shown. With each sender utilizing 10 locations, a total of 2000 drum locations have been used. Following the allocation for sender 200 are 1000 blank locations. Following these blanks are the second ten locations for sender 1, identical to the first locations and displaced from it by 3000 of the 5000 locations on the drum. In the index track, there are permanent magnetizations or markings for each location. These are indicated by an "X" in the index track along the entire circumference of the drum in Fig. 1. These markings are used to mark locations on the drum and to transmit the locating impulses to the binary counters necessary to magnetic drum storage in instances where stored locations are important. Also it may be seen from Fig. 1 that there are permanently magnetized spots in the start track for the 2000 locations which comprise the first group allocation to the 200 senders.

Adjacent each track is positioned a magnetic head. For the index track and the start track, only reading heads are required. The heads adjacent the digit tracks and the interdigital track are of the combined reading and writing type commonly in use. These combined heads have an inhibitor action to prevent simultaneous reading and writing attempts.

As mentioned previously each sender in the system has individual to it, equipment such as shown in Figs. 2 and 3. For ease of explanation and understanding, it will be assumed that the equipment shown in Figs. 2 and 3 is associated with sender #1. The sender as used herein is shown generally in the copending application 576,262 filed April 5, 1956 by I. Molnar now Patent 2,881,261 granted April 7, 1959.

*Operation*

The present invention has been designed for use in telephone systems having many manual operators positions utilizing the sending equipment of the system. The present invention might also be used for direct control automatic switching equipment, but the explanation has been mainly drawn to the use in conjunction with operators positions.

There is provided a sender such as Figs. 2 and 3 with each operator's position. The drum equipment of Fig. 4 may be commonly accessed from a maximum of 200 senders and used simultaneously.

In the circuit as shown, the sender of Figs. 2 and 3 is associated with operator's position #1 and drum locations 1111–1110 and 4111–4110. When a call is to be initiated from position #1, actuating means of any general sort such as the operator's jack, cord and position circuits are engaged. On engagement of these circuits, contacts C202 and C203 of Fig. 2 and contacts C301*b*, C302*b*, C303 and C304 all of Fig. 3 are closed. These may be relay contacts in the position circuit for example. Closing of contacts C203 close preparatory circuit paths. When contacts C202 close they complete a circuit from relay R250 to flip-flop circuit 215. This flip-flop circuit may be of any known design such as bi-stable tube circuit. The circuit to relay R250 is completed through the flip-flop and this relay operates on closure of contacts C202. At contacts 251 an output circuit is closed to the following switches in the system.

At closed contacts C301, a path is closed from ground through off-normal contacts 312, contacts C301*b*, interrupter contacts 311 to the switch motor magnet S310 to negative battery. Motor magnet S310 energizes, opening interrupter contacts 311 and the switch takes one step. After taking the step, off-normal contacts 312*b* are opened, thus opening the original operate path to magnet S310.

At contacts C302, ground is closed through off-normal contacts 333, contacts C302*b*, 331 to motor magnet S330 and battery. Energization of magnet S330 opens its energizing path and the switch comprising levels 334, 335, 336, 337, 338 and 339 steps its wipers to the first contact. Off-normal contacts 333*a* break to open the motor magnet operate path and the switch stops after the one step.

At contacts C303 a multiple battery connection path is closed. One path transmits the positive battery potential through resistor R345, contacts C303, 332, lead C225, contacts C203 to the hold anode of tube 211. The tube does not fire at this time. A second path is completed from positive battery through resistor R345, contacts C303 to the anodes of triode tubes T370, H371, D372 and U373. The cathodes of these triodes have a direct negative battery connection so that the positive charge from the battery path to the anodes causes the tubes to conduct.

At contats C304, positive battery is connected in this instance to triodes T360, H361, D362 and U363. These tubes thereby are rendered conductive.

The operations which have been described are the means of preparing the individual sender position for the transmission of digits from the initiating keys. Shown are keys K1 and K0 which represent respectively the digits 1 and 0. The intervening digit keys and the equipment exclusively provided for use with each digit have not been shown as they would be exact duplicates of the equipment shown for use with the digits 1 and 0.

For explanation it will be assumed that the first digit of a series to be sent from the initiating keys is "0" to be followed by a digit 1. All subsequent digits would be transmitted similarly, hence the pattern of operation will be fully illustrated by the use of these keys.

When the digit 0 is to be sent, key K0 is depressed closing its contacts 0*a* and 0*b*. Contacts 0*a* close ground to the cathode of tube M0. These tubes however do not fire at this time.

Since the position used in Figs. 2 and 3 is the first operator's position, the first digit of the series to be sent is to be recorded in the 1111 and 4111 locations on the track, the second in the 1112 and 4112 locations with a maximum of 10 locations allocated to position #1 ending at 1110 and 4110, as shown in Fig. 1.

As the drum rotates, pulses are fed continually from the indexing track to the common digital ring counters T401, H402, D403 and U404. These counters may be any convenient form of binary counter with a 5000 digit capacity. The counter must have a speed of operation which can count the drum pulses from the indexing track head H441. Counter U404 counts the units pulses and reflexes counter D403 on the tenth count. Counter H402 is reflexed on the hundredth count and counter T401 on the thousandth. Output leads U1—U0, D1—D0, H1—H0, T1—T5 receive pulses corresponding to the numerical designation of the drum location under the indexing head during that finite length of time. From each counter, one output lead alone will be marked negative at any time the entire counter system combinedly indicating the location number.

These output leads are multipled to the coincidence detector switch bank contacts at each of the individual sender positions. The particular wiring for position #1 and for sender #1 is shown roughly in Figs. 2 and 3 and in detail in Fig. 5. Levels 315, 316, 317, 318 and 319 are levels of the writing control switch under the control of motor magnet S310. Levels 335, 336, 337, 338 and 339 are all levels of reading control switch S330. Corresponding levels of each switch are wired together as shown. Keeping in mind the showing in Fig. 5 it will be understood that the wires (broken lines) terminating in the ten bank contacts in levels 316 and 336, Fig. 3, are cross-connected to a predetermined one of the five thousands leads (full lines) T1 to T5, Fig. 4, and that the wires (broken lines) terminating in the ten bank contacts in levels 315 and 335, Fig. 3, are cross-connected to the fourth following thousands lead (full lines), Fig. 4. The cross-connections between the various hundreds, tens and units levels, Fig. 3, with the hundreds leads H1—H0, tens leads D1—D0, and units leads U1—U0, respectively, Fig. 4, will be similarly understood from the example shown in Fig. 5.

Switch levels 319 and 339 represent the units level and the successive bank contacts are wired to successive output leads of units counter U404. The first bank contact is wired to lead U1, the second to U2 . . . tenth contact to lead U0. The ten contacts of ten levels 318 and 338 are wired in multiple to the D1 lead of tens counter D403. The hundreds levels 317 and 337 each have their ten contacts connected in multiple to the H1 lead of hundreds counter H402. Levels 316 and 336 have their ten contacts connected in multiple to the T1 lead of thousands counter T401 and levels 315 and 335 are connected in multiple to the T4 lead of thousands counter T401. Therefore, when the first digit is to be stored from operator's position #1 in locations 1111 and 4111, switch levels 314, 315, 316, 317, 318 and 319 have stepped to their first off-normal position. Tubes 360, 361, 362, 363 have fired. Key K0 has been depressed. As the drum rotates, drum positions pass the magnetic heads. As position 1111 or 4111 pass the heads, ground pulses are sent on each of the leads U1, D1, H1, and T1 and also T4 lead. Tubes T360, H361, D362 and U363 each receive a ground pulse on its grid and all are momentarily extinguished. When all these tubes are extinguished, a positive gating pulse is fed from the positive bias connection through resistor 309, capacitor 343 to the grids of the tubes M1—M0. Since the cathode of the tube M0 has been grounded by closing of contacts 0*a* of key K0, tube M0 fires sending an instantaneous pulse on lead C0 through amplifier A0 and writing head N0 to drum 100. The head impresses a magnetic spot in the tenth decimal track of the drum at the position which triggered the coincidence pulses through the counters to extinguish detector tubes T360—U363. When the drum has rotated so that position 1111 or 4111 are no longer under the magnetic heads, tube U363 refires immediately on the removal of the negative pulse on lead U1. The drop across tube U363 due to its firing is sufficient to lower the bias through capacitor 343 below the level necessary to maintain tube M0 conductive. Tube M0 is extinguished. When the drum is rotated past the other of the locations 4111 or 1111, a similar spot is magnetized in the "0" track through the coincidence detection. Thus no matter which of the two positions 1111 or 4111 receives the digit pulse designation first, the digit "0" is impressed on both positions 1111 and 4111.

When the digit key K0 is released, contacts 0*b* open causing writing switch magnet S310 to deenergize, thus stepping the wipers of levels 314, 315, 316, 317, 318 and 319 to their second off-normal contacts. Assume that the digit "1" is to follow as the second stored digit from position #1. The digit key K1 is depressed grounding contacts 1*a* and 1*b*. Switch motor magnet S310 is reenergized from the ground at 1*b*. Ground from 1*a* is placed on the cathode of tube M1 but tube M1 does not fire at this time. When the drum is rotating past position 1112 and 4112, and the first of these to pass the heads has operated the digital counters U401—T404 to the numerical indication of the location under the head, the coincidence detector tubes 360—363 extinguish. A positive gating pulse is sent to the grid of tube M1 and the tube fires sending a pulse to amplifier A1 and head N1 and a spot is magnetized in the "1" track. Another similar magnetization occurs in track "1" as the other of the two coincidence locations 4112 and 1112 passes the indexing head. The writing switch then is stepped to its third contact when the digit key is restored thus releasing release magnet S310, in a manner similar to that previously explained. In a like manner ten digits may be stored at successive positions.

It should be noted that since the coincidence detection tubes and switch banks are individual to the operator's positions, substantially simultaneous writing or reading operations may be occurring at other operators positions as the constant scanning of positions occurs through the medium of the common digital counter leads.

All that is required in order that a position be accessible to the drum storage equipment is that the position reading or writing switch be off-normal. In this condition the switch bank wiring connects the position to the leads of the digit counter for ultimate connection to the drum allocations.

*Transmitting digits*

In the foregoing explanation digits 0 and 1 have been stored on drum 100 and switch bank levels 314—319 are resting on their third off-normal contacts.

With the wiper level 334 either at normal or resting on the same bank contact as the wiper of level 314, differential relay R260 is maintained inoperative. This is due to the ground at contacts 256 being fed directly to the lower winding and through the back-to-back wiring of the levels 314 and 334 through the upper winding of relay R260. When this upper winding ground path is opened in the back-to-back wiring due to wiper of level 314 resting on a bank contact other than the resting point of wiper of level 334, relay R260 is energized. Contacts 261 are closed readying a path to "and gate circuits" 213 and 214. These "and" gate circuits may be of any of the conventional gate circuits which operate only on a number of conditions specifically two occurring simultaneously.

Tubes 370, 371, 372 and 373 have been conductive since the position bias at resistor 345 was closed through contacts C303 on closure. These tubes are extinguished each time the digital counters T401—U404 send out the numerical indication of the location on the drum corresponding to the switch contact on which the levels are resting. With contacts 261 closed, however, tubes T370—U373 extinguish. A battery pulse through resistor R345 and contacts C303 and 261 is then sent to "and" gate 213. When this battery pulse to circuit 213 coincides with a start pulse as received from start head H440, an output pulse is transmitted through the gate.

As previously mentioned, spots are permanently magnetized in the start track for the first 2000 positions on the drum. Hence, when a pulse is received from start head 440, through amplifier A430 on lead C233 to "and" circuit 213, one of the first 2000 drum locations is indicated as passing the head. On receipt of the coincidence battery pulse and the start pulse, an "and" pulse is sent from "and" gate 213 through amplifier 212 to tube 211. Tube 211 fires and once fired is maintained conductive over a path through closed contacts C203, lead C225, contacts 332, C303, resistor R345 and positive bias. A second output from circuit 213 is fed to the bistable flip-flop circuit 215. On receipt of the "and" pulse on lead C221 from "and" gate 213, a change of condition occurs in the flip-flop circuit 215 which thereby opens the circuit to relay R250. Relay 250 releases its contacts 251 opening the pulsing loop to an external circuit. Also at this time, on the extinguishing of tubes T370—U373 a second coincidence battery pulse is fed to "and" gate 214. When this coincidence pulse is received with the output of tube 211, this tube being in the fired condition, an output pulse is fed from "and" gate 214 through lead C234 to "and" gates 451—460 associated with the magnetic heads. In the "and" gate 460 this pulse coincides with a previously recorded pulse which is read on head N0 at position 1111 on the drum. A pulse is then sent to amplifier 470 which feeds the head above track 9. A spot is thereby magnetized at position 1111 in track 9 on the drum and the previously magnetized spot on track 0 is erased.

When the drum has rotated ⅜ of a revolution (60 milliseconds in time), position 4111 passes under the head. Tubes 370—373 are again extinguished by the potential applied by the counters on conductors T4, H1, D1, and U1. Since no start pulse is received from position 4111, "and" gate 213 remains unactivated. The extinguishing of the tubes T370—U373 again pulses lead C222 to the flip-flop 215. The condition of the flip-flop is thereby changed and relay R250 reoperates closing contacts 251. Also, "and" gate 214 transmits a pulse to magnetize a spot on the ninth track at location 4111 and erase the 0 track spot as has previously been done at location 1111.

This reading down sequence continues at positions 1111 and 4111 until the magnetized spot has been moved in successive steps to the first track under head N1 and all but the last of ten pulses of the digit 0 have been transmitted. As the sequence continues, the tenth and final outgoing pulse is sent, and "and" gate 451 has received its first pulse from "and" gate 214 and other pulse from magnetic head N1. The output of "and" gate 451 is fed through amplifier 461 to head H442 over the interdigital track. A spot is thereby magnetized on the interdigital track. At this time the digit 0 consisting of ten pulses has been fully transmitted.

On the next revolution of the drum a pulse is transmitted from head H442 through gate 462. The gate circuit 462 transmits a pulse to H442 to erase the spot on the interdigital track at drum location 1111. Further, gate circuit 462 transmits a pulse through amplifier A432 and lead C236 to "and" circuit 216. This pulse is received concurrent with the tube extinguish pulse from tubes T370—U373 as a result of which a pulse is sent to the pulse stretcher 217. This pulse stretcher may consist of a magnetostrictive delay line, relay timing apparatus or other delay apparatus. The pulse stretcher provides a delay period equal to an interdigital pause of the usual length as used in telephony, of approximately 500 to 600 milliseconds.

When the delay period has ended, a pulse is sent from pulse stretcher 217 to relay R255 causing this relay to operate. Contacts 256 open releasing the relay R260. Contacts 257 close to energize motor magnet S330. Contacts 332 open releasing the tube 211 hold path causing tube 211 to discharge. Contacts 331 open and cause motor magnet S330 to step once self-interruptedly. The wipers of levels 334—339 are thereby stepped to the second off-normal position.

When the wiper of level 334 is resting on the second contact and the wiper of level 314 on the third, relay R260 is reoperated and the digit "1" which was registered in the 1112 and 4112 locations is sent as a single 60 millisecond break period and a 40 millisecond make in a manner similar to that previously described. Further digits as stored are sent until wipers 314 and 334 are both resting on identical contacts.

If a stop dial condition exists on the output line, a signal is transmitted on lead C205 to the pulse stretcher which holds relay R255 operated until the line is in condition to receive the impulses of the next digit. This in effect is extending the interdigital period to prevent outpulsing until an automatic telephone switch is ready to receive the next digit. Additional digits are not prevented from being stored by the stop dial condition. Removal of the stop dial signal reactivates the digit transmission.

While only ten positions have been provided for storing ten successive digits, the system reflexes in such a manner that the eleventh digit from position #1 is stored in the first location 1111 and 4111, the twelfth in positions 1112 and 4112, etc. Both the switches associated with motor magnets S310 and S330 are arranged for 10 steps per revolution, automatically stepping over the home position in case more than ten digits are to be transmitted. Subsequent sender release homes the switch automatically to its home, or normal, position. The switch of motor magnet S310 is homed over the ground through off-normal contacts 312*a*, contacts C301*a*, 311 and switch magnet S310 until off-normal contacts 312*a* open in normal position. A similar path controls switch magnet S330 to restore the switch to the normal position.

What is claimed is:

1. In a telephone system, a digital storage device comprising a constantly rotatable magnetic drum surface, a plurality of individual stations having access to said storage device, each of said stations having allocated thereto predetermined locations on said drum surface, each of said locations including a first and a second plurality of magnetizable spots, each plurality of spots extending transversely and across said drum surface, said first and second pluralities of spots separated by a predetermined arc length, means associated with said drum surface and common to said plurality of stations for storing on said surface a digit from one of said stations, means at said one station cooperatively causing said digit to be stored in separate spots in each of said pluralities of spots in the locations allocated to said one station, said storage of a digit completely occurring on a single revolution of said drum surface, further means at said one station operative on completion of said storage for transmitting said digit from both said pluralities of spots to form an output signal of interrupted dial type pulses, said predetermined arc distance of said constantly rotating surface determinative of the length of said output pulses.

2. In a telephone system, a storage unit comprising a magnetizable drum rotating at a constant speed of one revolution per each standard telephone dial pulse period, said drum having a plurality of decimal tracks with each different decimal track corresponding to the value of a different decimal digit, means for sending a digit designation to said drum, means for recording said digit designation in a predetermined one of the decimal tracks which corresponds to the value of such digit designation means controlled by said recorded digit in said one predetermined track for transmitting one outgoing pulse during a predetermined percentage of the time period of one revolution, and for further erasing said recorded digit from said one predetermined track and for recording the next retrograde digit in the next retrograde track during a subsequent rotation of said drum; and said control means effective on each successive rotation of said drum following said retrogression for transmitting an outgoing pulse, for erasing the last recorded retrograde digit, and for recording successive retrograde digits in successive retrograde tracks until the number of transmitted outgoing pulses equals the value of the digit originally recorded in said predetermined track.

3. In a telephone system as claimed in claim 2 including another track in said drum, means effective in response to the last pulse of a recorded retrograde digit being transmitted and erased for making a recording in said other track, and means controlled by said recording in said other track on the next following rotation of said drum for delaying the transmission of subsequent outgoing pulses of a succeeding recorded digit for a predetermined time.

4. In a digit register for a telephone system, a magnetizable surface rotating at a constant predetermined speed, and a plurality of individual stations having access to said surface, each of said stations having allocated thereto two separate and distinct positions on said surface, means at each of said stations for initiating a decimal digital representation, means associated with said surface for registering each of said initiated representations in both of the positions allocated to the initiating station, both of said registrations occurring completely on one rotation of said magnetizable surface to completely record the digital representation in decimal form.

5. A telephone system comprising a multiple digit register, a plurality of digit initiating stations and a transmission network, said digit register comprising a magnetizable cylindrical surface rotating at a constant predetermined speed, each of said stations having allocated thereto a plurality of specific locations on said cylindrical surface, means at a first of said stations for sequentially initiating a series of digits, means in said register for causing each of said digits to be stored on a single separate rotation of said cylindrical surface, means responsive to a digit having been stored for transmitting each of said digits as a series of interrupted direct current pulses.

6. In a telephone system, a cylindrical magnetizable surface rotated at a constant predetermined speed, said surface including a plurality of peripheral digit value tracks and a plurality of transverse locations, a plurality of digit initiating stations, each of said stations having allocated thereto two spaced locations on said surface, individual transducer means associated with each of the digit value tracks of said surface, means at one of said stations for initiating a digit, means responsive thereto for twice activating one of said transducers at said two locations allocated to said one station to magnetize spots in the track of the initiated digit on one rotation of said surface, each rotation of said surface occurring during a period equal to the period of a standard dial pulse, means responsive to a digit having been stored to activate an output circuit, means in said output circuit for responding to a first of said stored spots to initiate an output pulse, further means in said output circuit for ending said pulse on reception of the second stored spot on the same revolution of said surface, the spatial displacement of said two spots rotatively comprising the duration of a dial pulse make period.

7. In a telephone system, a digital storage device comprising a magnetizable drum surface rotating at a constant speed of ten revolutions per second, said drum surface having a plurality of peripheral tracks and lateral positions, a plurality of digit initiating stations having access to said drum surface on each revolution thereof, means at one of said stations for initiating a binary decimal digit, means associated with said drum surface for recording said digit therein by magnetizing two positions on said surface in a track allocated to the initiated digit during one rotation of said drum surface, said two magnetized surface positions allocated to said one initiating station, said magnetized two positions having a predetermined arc interval of four-tenths of a revolution, means responsive to a digit having been recorded for initiating an output circuit, means in said output circuit activated by a first of said two magnetized positions for initiating an output pulse, said output circuit means deactivated by said second magnetized position to terminate said output pulse at the conclusion of said fourth-tenths of a revolution interval to thereby simulate a standard dial pulse, means operated by said activation and deactivation to re-store a second digit by magnetizing in the two positions of said one initiating station in the adjacent track representing the digit next lower than the initiated digit, said output circuit means responsive to said magnetization of said second digit to transmit a pulse of the same length as said first pulse, means for stopping said transmission and re-storage after a series of simulated dial pulses equal in number to the value of the initiated digit have been transmitted.

References Cited in the file of this patent

UNITED STATES PATENTS

| | | |
|---|---|---|
| 2,700,148 | McGuigan et al. | Jan. 18, 1955 |
| 2,723,311 | Malthaner et al. | Nov. 8, 1955 |
| 2,738,382 | Brooks et al. | Mar. 13, 1956 |
| 2,764,634 | Brooks et al. | Sept. 25, 1956 |